(12) United States Patent
Miyazaki

(10) Patent No.: US 6,370,447 B1
(45) Date of Patent: Apr. 9, 2002

(54) CONVEYANCE SYSTEM

(75) Inventor: Toshihiro Miyazaki, Kurodasho-cho (JP)

(73) Assignee: Kyowa Manufacturing Co., Ltd., Hyogo-ken (JP)

( * ) Notice: Subject to any disclaimer, the term of this patent is extended or adjusted under 35 U.S.C. 154(b) by 0 days.

(21) Appl. No.: 09/680,839

(22) Filed: Oct. 6, 2000

(30) Foreign Application Priority Data

Oct. 8, 1999 (JP) .......................................... 11-288559

(51) Int. Cl.[7] .................................................. G06F 7/00
(52) U.S. Cl. ........................ 700/230; 700/225; 700/226; 198/349.8; 198/349.9; 198/368; 198/369.1; 198/370.01; 198/781.01; 198/781.05; 198/786; 198/790
(58) Field of Search ......................... 700/3, 13, 228, 700/230, 225, 226; 198/358, 349.8, 349.9, 368, 369.1, 370.01, 572, 780, 781.01, 781.05, 786, 790

(56) References Cited

U.S. PATENT DOCUMENTS

| | | | | |
|---|---|---|---|---|
| 5,042,644 A | * | 8/1991 | Davis | 198/781 |
| 5,058,727 A | * | 10/1991 | Jahns et al. | 198/460 |
| 5,060,785 A | * | 10/1991 | Garrity | 198/781 |
| 5,070,995 A | * | 12/1991 | Schaffer et al. | 198/460 |
| 5,136,498 A | * | 8/1992 | McLaughlin et al. | 364/184 |
| 5,582,286 A | * | 12/1996 | Kalm et al. | 198/781.06 |
| 5,655,667 A | * | 8/1997 | Isaacs | 209/539 |
| 5,862,907 A | * | 1/1999 | Taylor | 198/781.05 |
| 6,021,888 A | * | 2/2000 | Hoh et al. | 198/783 |
| 6,047,812 A | * | 4/2000 | Horn et al. | 198/781.06 |
| 6,253,906 B1 | * | 7/2001 | Hall | 198/460.1 |

* cited by examiner

Primary Examiner—Christopher P. Ellis
Assistant Examiner—Khoi H. Tran
(74) Attorney, Agent, or Firm—Rosenthal & Osha L.L.P.

(57) ABSTRACT

A communication master unit of a conveyance controller and communication slave units for a main conveyor, loading conveyors and unloading conveyors are connected by a serial transmission line to transmit and receive different kinds of data signals to and from motorized rollers for conveying items and their corresponding sensors by the packet-switching exchange system. Conveyance control can be executed by transmitting and receiving the different kinds of data signals via reduced number of wirings while connecting the master unit and the slave units corresponding to the respective conveyors by the serial transmission line in a conveyor system.

8 Claims, 9 Drawing Sheets

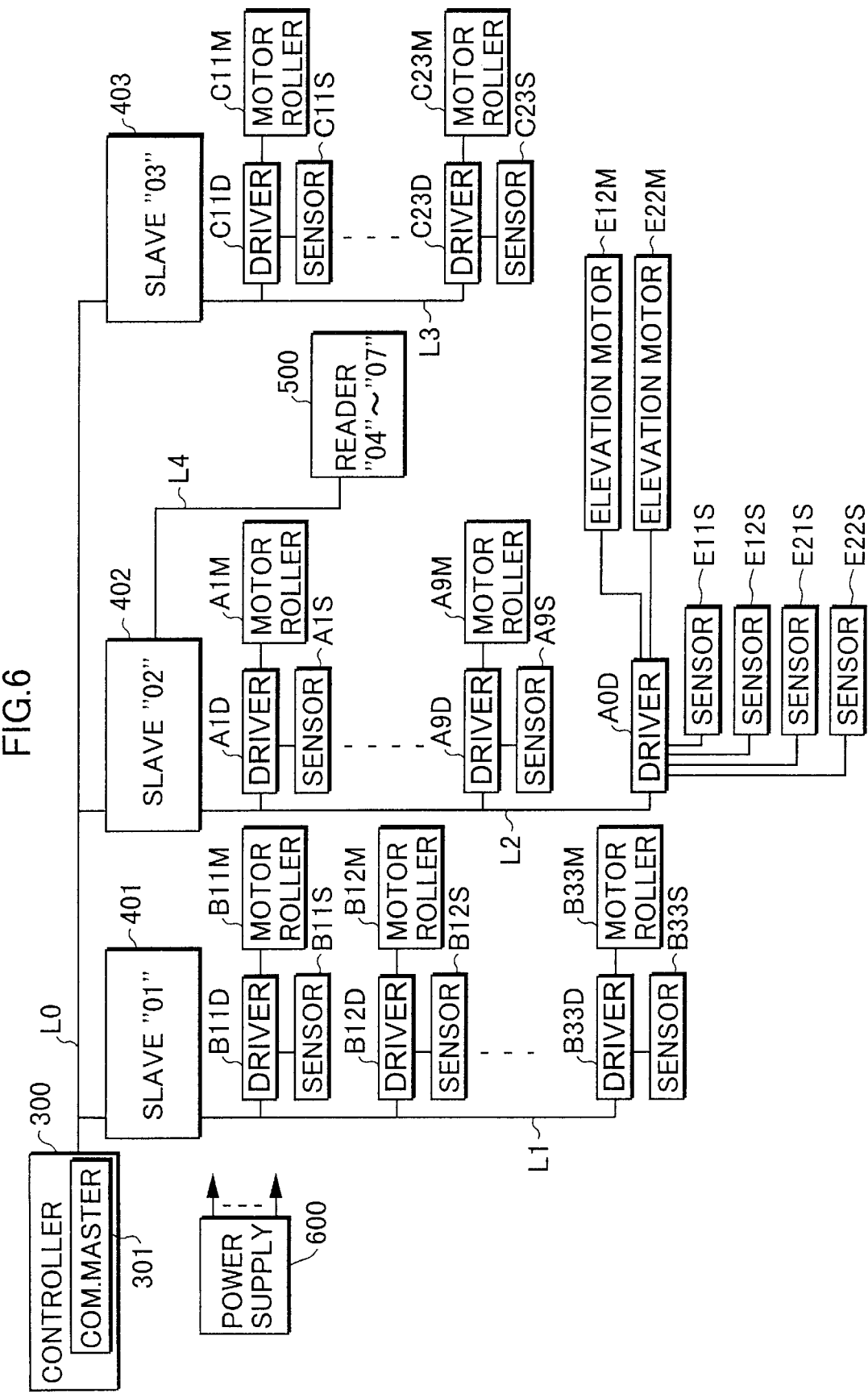

FIG.8A
SENSOR MEMORY

| B11 | 47or40 |
|---|---|
| B12 | |
| ⋮ | ⋮ |
| C23 | 47or40 |

FIG.8B
MOTOR MEMORY

| B11 | 4For41 |
|---|---|
| B12 | |
| ⋮ | ⋮ |
| A1 | |
| A2 | |
| ⋮ | ⋮ |
| E11 | |
| ⋮ | ⋮ |
| A9 | |
| C11 | |
| ⋮ | ⋮ |
| C23 | 4For41 |

FIG.8C
BAR CODE MEMORY

| 04 | 31(H)or32(H) |
|---|---|
| 05 | |
| 06 | |
| 07 | |

FIG.8D
STOPPER MEMORY

| E12 | 4F(41) |
|---|---|
| E22 | 41(4F) |

CONVEYANCE SYSTEM

BACKGROUND OF THE INVENTION

This invention relates to a conveyance system for a conveyor assembly constructed by arranging a plurality motorized rollers used for so-called goods conveyance for, e.g., loading and unloading parts in an automated warehouse or sorting postal matters.

A roller conveying apparatus (conveyor assembly) in which a multitude of motors and motorized rollers having a built-in speed reducer are arranged along an entire conveyance path with free rollers provided therebetween such that their longitudinal directions are normal to a direction of goods conveyance is known. The motorized roller used in such a conveyor assembly gives a conveying force to an item on a rotary drum by driving a motor in the rotary drum in the form of a roller and transmitting a rotational force to the rotary drum at the outer side via the speed reducer.

In recent years, a multitude of branch paths are provided to cope with a plurality of joint paths or a multitude of sorting ends by extending the lengths of conveyors in a roller conveyor assembly and the like for, e.g., sorting postal matters. However, if an increased number of motorized rollers are used as the length of the conveyor assembly is extended, power consumed is not negligible if the respective motorized rollers are constantly rotated. Accordingly, a conveyance controller constructed by a computer or the like has been recently used to drive the motorized rollers only while the goods are being conveyed by detecting the presence or absence of the goods, thereby centrally executing conveyance control for the purpose of power saving.

However, in order to execute the highly efficient conveyance control described above, a multitude of sensors for detecting the presence or absence of the goods need to be so provided as to correspond to the respective motorized rollers. Thus, the number and length of wires provided between the conveyance controller and the respective parts including wires for transmitting drive signals to the respective motorized rollers and wires between the respective sensors become huge. Particularly, in positions near the conveyance controller, bundles of wires become thick, which necessitates a construction of the conveyor assembly considering a space for such thick bundles of wires and a wiring construction. Further, since the number of the wires is huge, an unnecessarily long time is needed for the diagnosis and inspection at the time of a mechanical trouble, maintenance, etc.

SUMMARY OF THE INVENTION

It is an object of the present invention to provide a conveyance system which is free from the problems residing in the prior art.

According to an aspect of the invention, a conveyance system is provided with a conveyor assembly including a first conveyor unit and a second conveyor unit arranged after the first conveyor unit. Each conveyor unit is provided with a plurality of motorized rollers. Each motorized roller has a rotary drum and a motor for rotating the rotary drum. There are provided a plurality of free rollers between two adjacent motorized rollers. The motorized rollers are driven to convey items from the first conveyor unit to the second conveyor unit.

The conveyance system is further provided with a conveyance controller having a communication master function, a sensor at a position corresponding to each of the plurality of motorized rollers in each of the first and second conveyor units for detecting presence or absence of an item, a first communication slave unit in a position corresponding to the first conveyor unit and be able to communicate with the conveyance controller in serial transmission, a second communication slave unit in a position corresponding to the second conveyor unit and be able to communicate with conveyance controller in serial transmission, and a transmitting/receiving device for rendering communications between each sensor and the corresponding communication slave unit and communications between each motorized roller and the corresponding communication slave unit to transmit a drive signal for the corresponding motorized roller to the corresponding communication slave unit and receive a detection signal of the corresponding sensor.

The conveyance controller includes a receiver for cyclically receiving respective detection signals of the sensors via the first and second communication slave units, a command data generator for generating operation command data to rotate or stop relating motorized rollers in response to the detection signals from the sensors received by the receiver, and a transmitter for cyclically transmitting generated operation command data to the first and second communication slave units in serial transmission.

These and other objects, features and advantages of the present invention will become more apparent upon a reading of the following detailed description and accompanying drawings.

BRIEF DESCRIPTION OF THE DRAWINGS

FIGS. 5A and 5B are diagrams showing a construction of a roller unit of a conveyance end switching mechanism, wherein FIG. 5A is a diagram viewed in longitudinal direction and FIG. 5B is a diagram viewed in a direction normal to a longitudinal axis;

FIG. 6 is a block diagram showing a control system for controlling drive of the conveyor system;

FIGS. 8A to 8D are diagrams showing memory maps of a data storage, wherein

FIG. 8A shows a sensor memory,

FIG. 8B shows a motor memory,

FIG. 8C shows a bar code memory and

FIG. 8D shows a stopper memory; and

DETAILED DESCRIPTION OF THE PREFERRED EMBODIMENTS OF THE INVENTION

Figure 1:
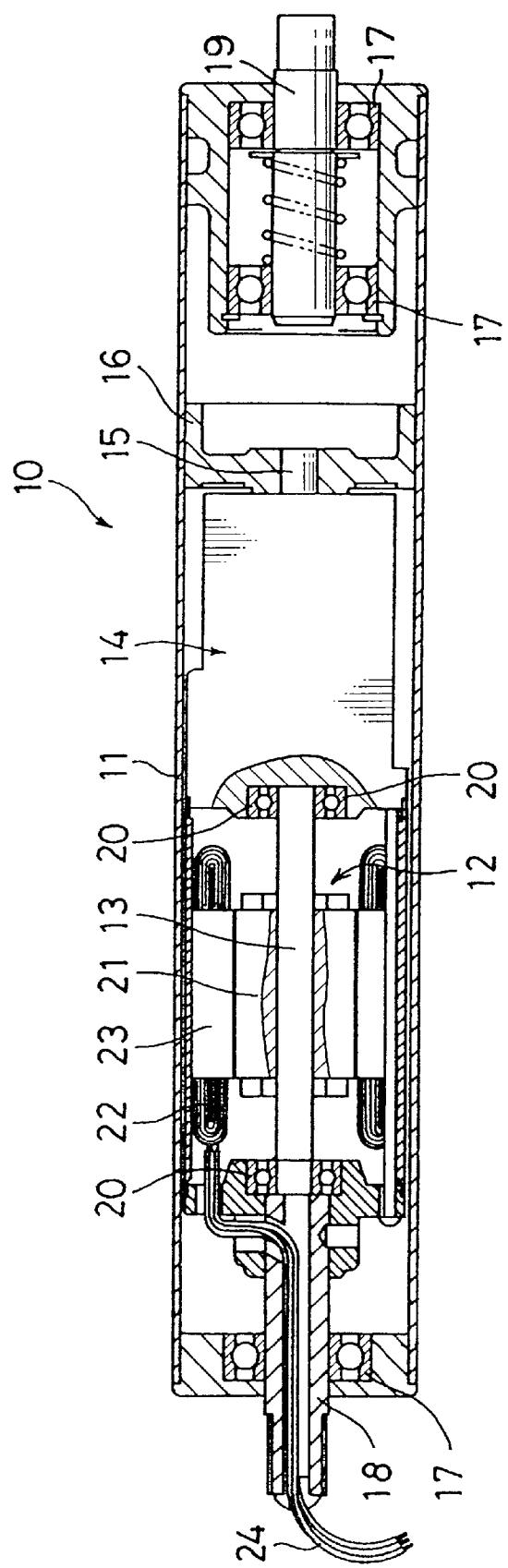
FIG. 1 is a vertically sectional view showing a motorized roller used in a conveyance system according to an embodiment of the invention.

Referring to FIG. 1 which shows a motorized motor 10 used in a conveyance system embodying the invention, the motorized roller 10 is provided with a cylindrical rotary drum 11, a motor 12 provided in the rotary drum 11 and having a rotary shaft 13 concentric with the rotary drum 11, a speed reducing mechanism 14 coupled to one end of the rotary shaft 13 of the motor 12, a coupling member 16 for coupling an end of an output shaft 15 of the speed reducing mechanism 14 and the rotary drum 11, and supporting shafts 18, 19 for rotatably supporting the entire motorized roller 10 via bearings 17 in order to enable the rotation with respect to the rotary drum 11. The supporting shafts 18, 19 have engaging portions partially projecting in the longitudinal direction of the motorized roller 10.

The motor 12 is, for example, a direct current brushless motor including a rotary element 21 which is fixedly attached to the rotary shaft 13 and in which a plurality of magnets are so circumferentially arranged as to alternate the magnetic poles thereof, and a fixed element 23 which faces the outer surface of the rotary element 21 and is circumferentially formed with a specified number of magnetic poles 22. Windings forming the magnetic poles 22 are drawn out via lead wires 24 extending inside a tubular supporting shaft 18. The motor 12 is caused to generate a rotational force acting in one direction by applying phase-shifted pulse voltages to the lead wires 24 to successively excite the magnetic poles 22.

The speed reducing mechanism 14 is constructed in a conventional manner. Specifically, the speed reducing mechanism 14 is comprised of a sun gear (not shown) coupled to one end of the rotary shaft 13, a plurality of planetary gears (not shown) in mesh with the sun gear around it, and an output shaft 15 for rotatably supporting the shafts of the respective planetary gears together.

Figure 2:
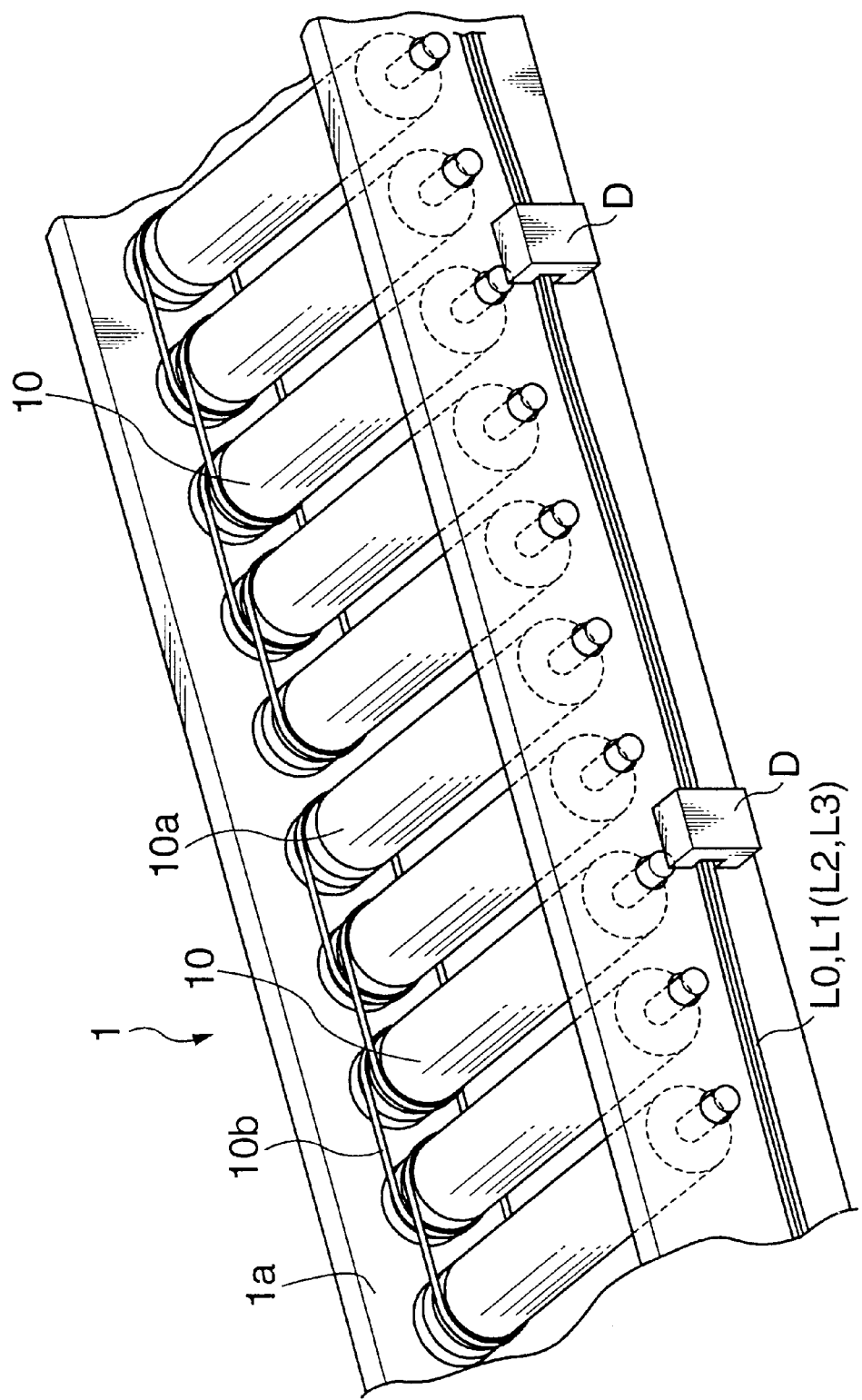
FIG. 2 is a partially perspective view showing a conveyor, an arrangement of motorized rollers and free rollers, and a belt mounting structure.

The supporting shafts 18, 19 are engaged with a side wall 1a of a conveyor assembly 1 shown in FIG. 2, thereby being not rotatable. Thus, when a rotational force is applied to the motor 12, it relatively rotates the rotary drum 11 at a specified reduction gear ratio via the rotary shaft 13, the speed reducing mechanism 14 and the coupling member 16.

In FIG. 2, the conveyor assembly 1 has a pair of side walls 1a which extend in a conveying direction and are spaced apart by a specified distance. Between the side walls 1a, motorized rollers 10 and free rollers 10a are arranged in parallel to each other in a specified relationship in the conveying direction, and form a so-called ladder construction.

In this embodiment, four free rollers 10a are arranged between two adjacent motorized rollers 10. A set of rollers is comprised of one motorized roller 10 and two upstream free rollers 10a and two downstream free rollers 10a from the motorized roller 10. In the set of rollers, pairs of adjacent rollers are coupled with the motorized roller 10 as a center by mounting belts 10b thereon, so that the rotational force of the motorized roller 10 can be transmitted to the free rollers 10a. The position of the motorized roller 10 with respect to the free rollers 10a is not limited to the center position as in this embodiment, but may be a most upstream position or a most downstream position. The number of the free rollers 10a which operate together with one motorized roller 10 is not limited to four, and a specified number may be set in view of a torque of the motorized roller 10, the shape and weight of items to be conveyed, etc.

A spacing between adjacent rollers 10, 10a is set in view of the length of the items to be conveyed so as to ensure a suitable conveyance of the items, and the length (longitudinal dimension) of the rollers 10, 10a is set in view of the width of the items to be conveyed. In this embodiment, palettes containing postal matters sorted according to destinations (e.g., based on zip codes) are adopted as items to be conveyed. What to be conveyed is not limited to the palettes, and may be postal matters themselves. Alternatively, the present invention is applicable to such a mode in which necessary parts are conveyed to specified unloading stations, for example, in an automated warehouse. Besides the mode having a plurality of unloading stations, the present invention is also applicable to a mode having a plurality of unloading stations and a plurality of loading stations in view of various kinds of items (or dispersion of loading sections). Drivers D are mounted on the outer surface of the side wall 1a in positions corresponding to those of the motorized rollers 10. The drivers D are adapted to controllably drive and stop the motors 12 of the corresponding motorized rollers 10 and to receive detection signals from corresponding sensors (not shown in FIG. 2) as described later.

Figure 3:
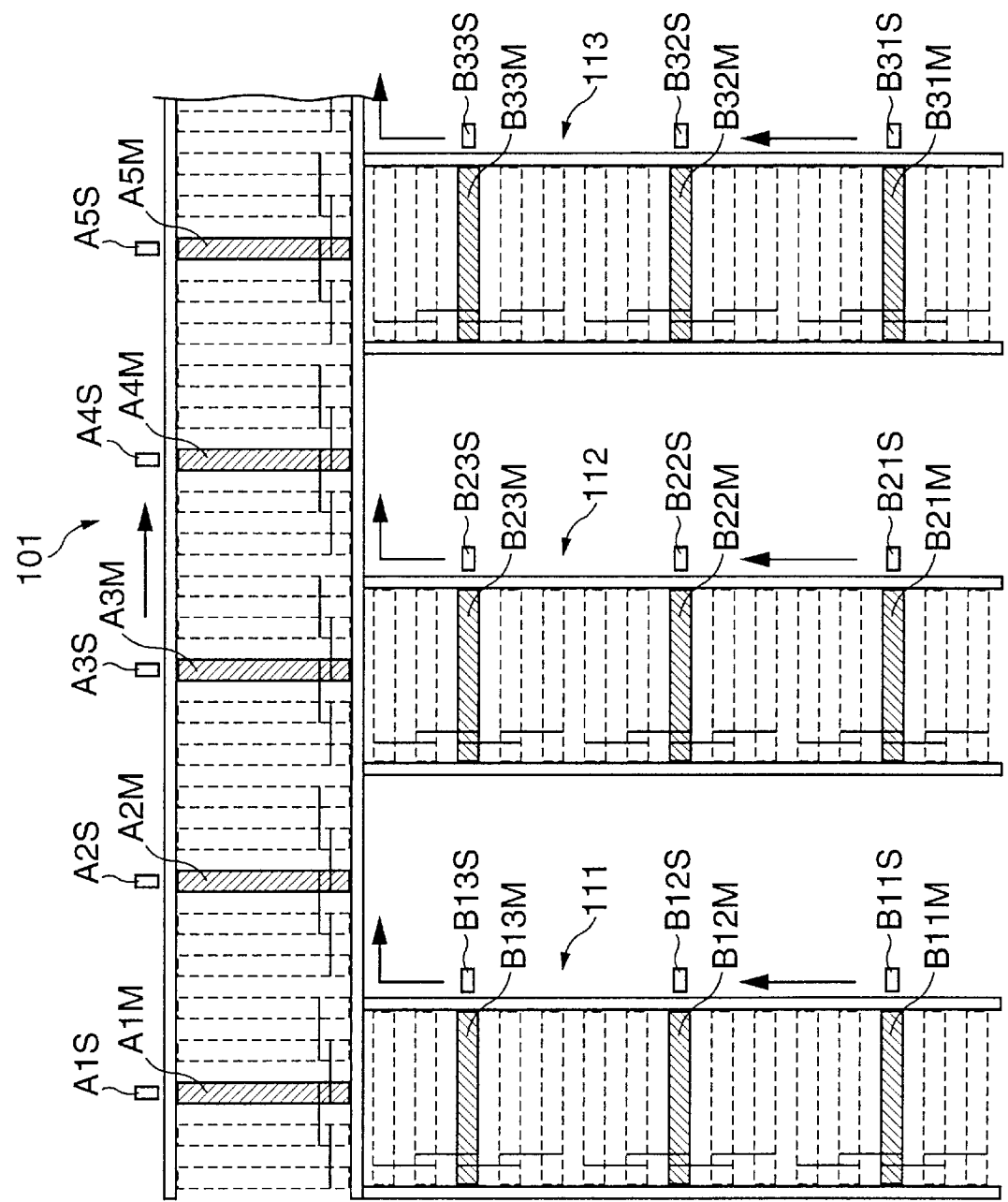
FIG. 3 is a plan view showing an upstream part of a conveyor assembly in the conveyance system.
Figure 4:
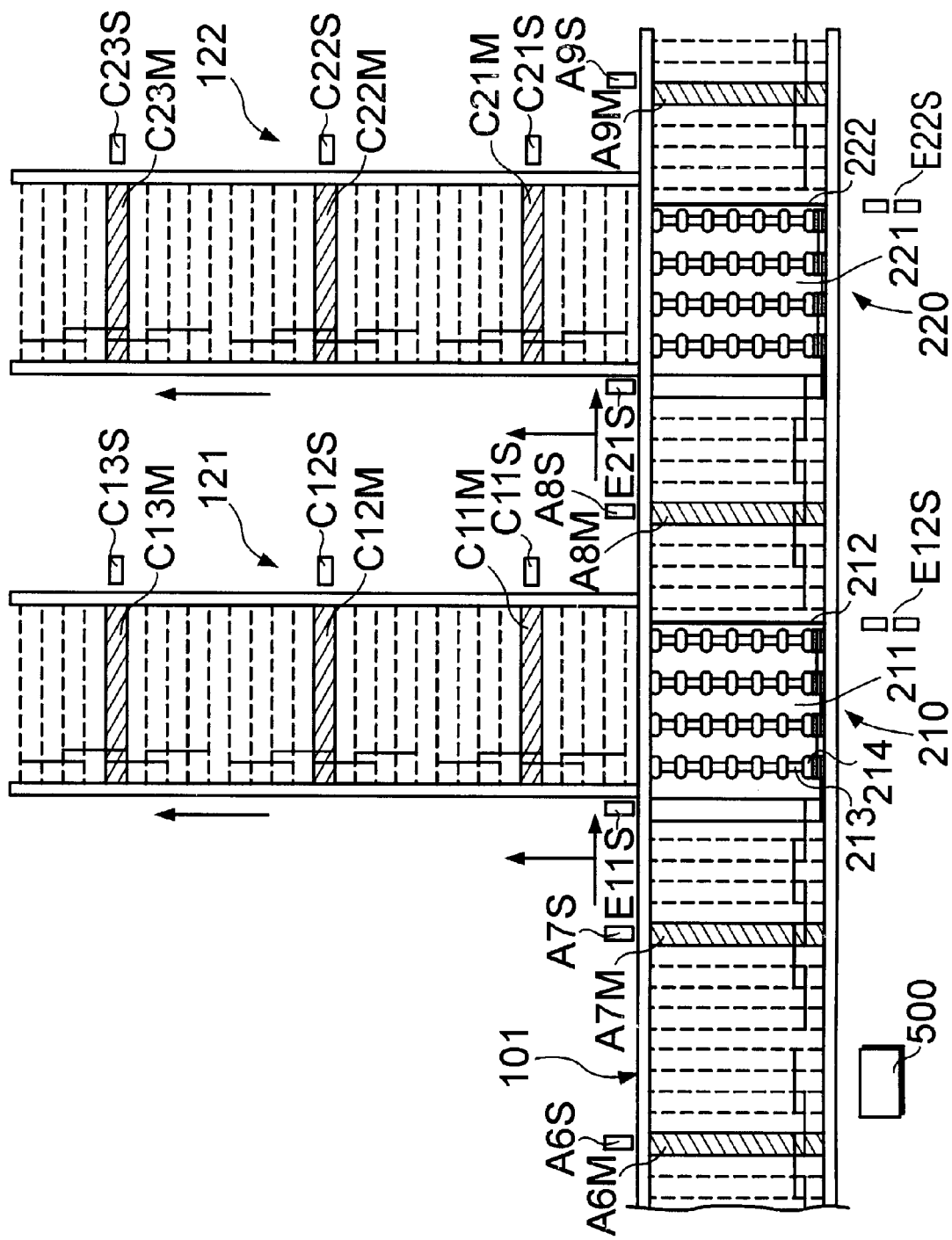
FIG. 4 is another plan view showing a downstream part of the conveyor assembly in the conveyance system.

FIGS. 3 and 4 are divided diagrams showing one exemplary construction of the conveyor assembly of the conveyance system in plan view, wherein FIG. 3 shows an upstream half and FIG. 4 shows a downstream half.

In FIGS. 3 and 4, the conveyor assembly 1 is comprised of a main conveyor 101 at the center, loading conveyors 111, 112, 113 which are connected with the main conveyor 101 at an upstream side and spaced apart from each other for loading items to the main conveyor 101, and two unloading conveyors 121, 122 which are connected with the main conveyor 101 at a downstream side for branching off a conveyance path. The main conveyor 101 is provided with nine motorized rollers A1M to A9M; each of the loading conveyors 111, 112, 113 is provided with three motorized rollers B11M to B33M, and each of the unloading conveyors 121, 122 is provided with three motorized rollers C11M to C23M. In positions where the respective motorized rollers 10 are provided, corresponding sensors A1S to A9S (main conveyor 101), B11S to B33S (loading conveyors 111 to 113) and C11S to C23S (unloading conveyors 121, 122) are mounted. In the following description, these sensors are collectively referred to as sensors S except in a case where they are individually described, and these motorized rollers are collectively referred to as motorized rollers 10 except in a case where they are individually described.

Each sensor S is a photointerrupter provided with a light emitter and a photodetector, and is provided, for example, on the inner surface of one side wall 1a of the conveyor assembly 1 for detecting the presence or absence of a palette by detecting a light emitted from the light emitter and reflected by a side surface of the passing palette by means of the photodetector. It does not particularly matter where the sensors S are mounted provided that they can detect the passing palettes. For example, the sensors S may be so arranged as to face upward in a clearance between the respective motorized rollers 10 and the free rollers 10a immediately downstream therefrom (or immediately upstream therefrom). In such a case, the presence or absence of sheet-shaped materials such as postal matters being conveyed can also be detected. The sensors S are not limited to optical sensors, but may be proximity sensors including magnetic sensors or mechanical switches which make a detection by being directly brought into contact with the palettes. The loading conveyors 111, 112, 113 are joined with the main conveyor 101 in such positions where the corresponding motorized rollers 10 of the main conveyor 101 are located at the widthwise center of the loading conveyors 111, 112, 113. Accordingly, the palettes conveyed onto the main conveyor 101 are securely conveyed to a downstream side by the main conveyor 101. The unloading conveyors 121, 122 are arranged such that the motorized rollers 10 follow after two free rollers 10a from the branched positions thereof. Accordingly, the palettes conveyed to the unloading conveyor 121, 122 from the main conveyor 101 can be securely conveyed to unloading stations.

Conveyance end switching mechanisms 210, 220 are provided in intermediate positions of the main conveyor 101 where the unloading conveyors 121, 122 are branched off. The conveyance end switching mechanism 210, 220 respectively include roller units 211, 221 shown in FIG. 5, motorized rollers A7M, A8M for driving the roller units 211, 221, stoppers 212, 222 which are, for example, contact plates provided immediately downstream from the roller units 211, 221 so as to be movable upward and downward, and elevation motors (see E12M, E22M of FIG. 6) or like motors which are driving sources for elevating the stoppers 212, 222. Instead of the motorized rollers A7M, A8M, only one motor can be used for the same purpose by rotating the roller units 211, 221 by the elevation motors via clutches. For instance, the clutch may be mechanically automatically switched to drive the roller unit 211 (221) only when the stopper 211 (222) is located in an elevated position. Elevation sensors E12S, E22S for detecting elevated and lowered positions of the stoppers 212, 222 are provided in the positions of the stoppers 212, 222. Further, sensors E11S, E21S for detecting the conveyance of the palettes are provided in positions immediately upstream from the conveyance end switching mechanisms 210, 220.

Since the roller units 211, 221 have an identical construction, description is given only on the roller unit 211 with reference to FIGS. 4 and 5. The roller unit 211 is formed of a known material. As shown in FIG. 4, four rotary shafts 213 are so supported on the side walls 1a as to extend in parallel with the respective rollers of the main conveyor 101 while belts are successively mounted on two adjacent ones, and a belt is mounted on the most upstream roller unit 212 and one free roller 10a immediately upstream therefrom. A belt is further mounted on this free roller 10a and the one immediately upstream therefrom. As a result, a rotational force of the motorized roller A7M is transmitted to the roller units 211 to rotate them. A specified number of rollers 214 are mounted on each rotary shaft 213 at specified intervals along its longitudinal direction. In this embodiment, seven rollers 214 are mounted on one rotary shaft 213.

Figure 5A:
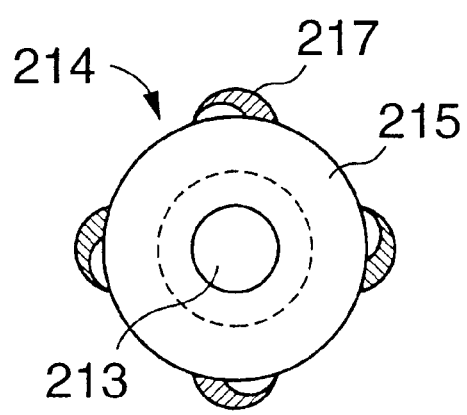
Figure 5B:
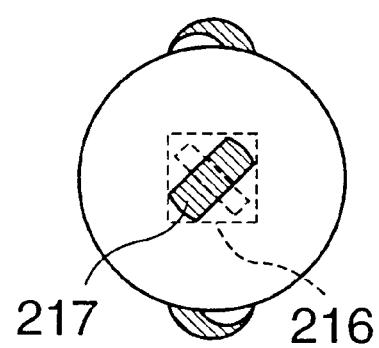

As shown in FIGS. 5A and 5B, each roller 214 has a spherical base 215 in the center of which the rotary shaft 213 is inserted through. At parts of the outer surface of the spherical base portion 215 normal to the rotary shaft 213, four recesses 216 which have the same shape and extend at 45° to the extension of the rotary shaft 213 are formed at regular intervals. A small roller 217 is rotatably supported inside each recess 216 with its outer surface partially exposed. With the rollers 214 thus constructed, when the rotary shafts 213, i.e., the base portions 215 are rotated, the rollers 217 are rotated to give the palette on the rollers 217 a conveying force acting in a direction at 45° to the extension of the rotary shafts 213. Accordingly, if the stopper 212 is located in a lowered position, the palette comes into sliding contact with the side wall 1a of the main conveyor 101 immediately downstream there from while being conveyed, thereby being further conveyed downstream although receiving a conveying force acting in the direction of 45° on the rollers 217. On the other hand, if the stopper 212 is located in the elevated position, the palette is conveyed toward the unloading conveyor 121 while being held in sliding contact with an upstream surface of the stopper 212, thereby changing the conveying direction.

A bar code reader 500 as a discriminator for discriminating a conveyance end is provided in an intermediate position of the main conveyor 101 between the loading conveyor 113 and the conveyance end switching mechanism 211. The conveyance end is written in a specified position of a side surface of each palette in the form of, e.g., a bar code, and the bar code reader 500 reads this conveyance end.

In FIG. 6 showing a control system for controlling the drive of the conveyance system, the control system is provided with a conveyance controller 300 including a computer having a communication master unit 301 at its extension slot, communication slave units 401, 402, 403 connected in series with the communication master unit 301 via a serial transmission line L0. The communication slave unit 401 constructs a loading conveyor control unit; the communication slave unit 402 constructs a main conveyor control unit, and the communication slave unit 403 constructs an unloading conveyor control unit. The respective communication slave units 401, 402, 403 have drivers D corresponding to the motorized rollers 10.

Specifically, the communication slave unit 401 includes drivers B11D to B13D corresponding to the loading conveyor 111, drivers B21D to B23D corresponding to the loading conveyor 112 and drivers B31D to B33D corresponding to the loading conveyor 113 in its lower rank, and is connected with these drivers via a local serial transmission line L1. The communication slave unit 402 includes drivers A1D to A9D corresponding to the main conveyor 101 in its lower rank, and is connected with these drivers via a local serial transmission line L2. The communication slave unit 403 includes drivers C11D to C13D corresponding to the unloading conveyor 121 and drivers C21D to C23D corresponding to the unloading conveyor 122, and is connected with these drivers via a local serial transmission line L3. The drivers D are all connected with the corresponding motorized rollers 10 and sensors S via individual lines.

In the communication slave unit 402, a driver A0D corresponding to elevation motors E12M, E22M and the sensors E11 to E22 is similarly connected with the serial transmission line L2. Further, the bar code reader 500 is connected with the communication slave unit 402 via another line L4. Identified by 600 is a motor power supply for supplying a direct current power for driving the motors 12 of the motorized rollers 10, and individual power supply lines are provided between the motor power supply 600 and the respective motorized rollers 10. Power line wirings can be saved by serially connecting a specified number of motorized rollers within a range where a voltage reduction is at a permissible level.

Figure 7:
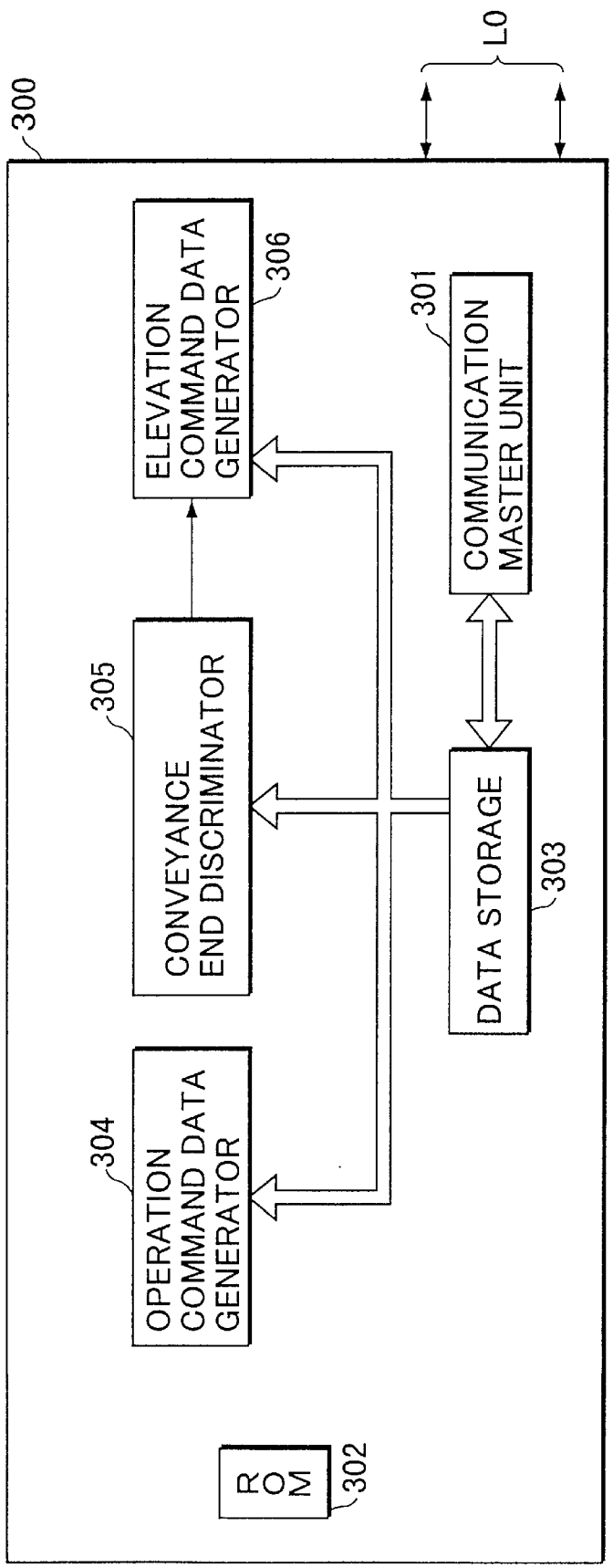
FIG. 7 is a block diagram showing a construction of a conveyance controller.

FIG. 7 is a block diagram showing a construction of the conveyance controller 300. The conveyance controller 300 is provided with a ROM 302 in which a conveyance control program for controlling the drive of the conveyor system shown in FIGS. 3 and 4 is stored, a data storage 303 for storing data received and transmitted via the communication master unit 301, an operation command generator 304 for generating operation command data given to the respective motorized rollers 10 in accordance with the conveyance control program and the data stored in the data storage 303, a conveyance end discriminator 305 for discriminating a conveyance end based on a data read by the bar code reader 500, and an elevation command data generator 306 for generating operation command data given to the elevation motors E12M, E22M based on the discrimination result of the conveyance end discriminator 305 and the detection results of the sensors E11S and E21S.

The communication master unit 301 conducts data transfers between the communication slave units 401 to 403 and the bar code reader 500 by means of packet-switching exchange. In a mode adopting a half-duplex operation as a communication system, transmission of one packet of data and reception of one packet of data are alternately performed. In a mode adopting a full-duplex operation, data can be successively received while data are successively transmitted. Thus, a time required to exchange all the packets (one scan communication time) is half the time required in the case of the half-duplex operation, i.e., a higher speed communication can be conducted.

In this embodiment, the communication master unit 301 allots addresses "01", "02" and "03" to the communication slave units 401, 402, 403, respectively. The communication master unit 301 also allots addresses for the bar code reader 500. Specifically, if the bar code reader 500 reads eight characters, addresses "04" to "07" are allotted to two each of the characters from the top and prepares packets for the respective pairs of the characters. The packet includes a transmitting-side packet cyclically transmitted from the communication master unit 301 and a receiving-side packet cyclically transmitted from the communication slave unit to the communication master unit 301.

In this embodiment, one packet consists of 16 bits; data to be transmitted from the communication master unit 301 include a start/stop command to the motorized rollers 10 represented by 1/0 (high/low) and an upward/downward command to the elevation motors E12M, E22M represented by 1/0 (high/low); and data to be received include detection data of the sensors S represented by 1/0 (high/low) and a read data from the bar code reader 500. In the transmitting-side and receiving-side packets, either 1 or 0 is given to the respective bits as shown in TABLE-1 through TABLE-6 for the data communications between the communication master unit 301 and the respective communication slave units 401 to 403. It should be noted that the read data of the bar code reader 500 are transmitted and received as they are.

16 bits of each transmitting-side packet are allotted to the motorized rollers and the elevation motors as follows.

TABLE-1

Concerning the communication slave unit 401, i.e., address "01"

| | |
|---|---|
| Motorized Roller B11M | $1^{st}$ bit (1 or 0) |
| Motorized Roller B12M | $2^{nd}$ bit (1 or 0) |
| Motorized Roller B13M | $3^{rd}$ bit (1 or 0) |
| Motorized Roller B21M | $4^{th}$ bit (1 or 0) |
| Motorized Roller B22M | $5^{th}$ bit (1 or 0) |
| Motorized Roller B23M | $6^{th}$ bit (1 or 0) |
| Motorized Roller B31M | $7^{th}$ bit (1 or 0) |
| Motorized Roller B32M | $8^{th}$ bit (1 or 0) |
| Motorized Roller B33M | $9^{th}$ bit (1 or 0) |

TABLE-2

Concerning the communication slave unit 402, i.e., an address "02"

| | |
|---|---|
| Motorized Roller A1M | $1^{st}$ bit (1 or 0) |
| Motorized Roller A2M | $2^{nd}$ bit (1 or 0) |
| Motorized Roller A3M | $3^{rd}$ bit (1 or 0) |
| Motorized Roller A4M | $4^{th}$ bit (1 or 0) |
| Motorized Roller A5M | $5^{th}$ bit (1 or 0) |
| Motorized Roller A6M | $6^{th}$ bit (1 or 0) |
| Motorized Roller A7M | $7^{th}$ bit (1 or 0) |

TABLE-2-continued

Concerning the communication slave unit 402, i.e., an address "02"

| | |
|---|---|
| Motorized Roller A8M | $8^{th}$ bit (1 or 0) |
| Motorized Roller A9M | $9^{th}$ bit (1 or 0) |
| Elevation Motor E12M | $10^{th}$ bit (1 or 0) |
| Elevation Motor E22M | $11^{th}$ bit (1 or 0) |

TABLE-3

Concerning the communication slave unit 403, i.e., address "03"

| | |
|---|---|
| Motorized Roller C11M | $1^{st}$ bit (1 or 0) |
| Motorized Roller C12M | $2^{nd}$ bit (1 or 0) |
| Motorized Roller C13M | $3^{rd}$ bit (1 or 0) |
| Motorized Roller C21M | $4^{th}$ bit (1 or 0) |
| Motorized Roller C22M | $5^{th}$ bit (1 or 0) |
| Motorized Roller C23M | $6^{th}$ bit (1 or 0) |

TABLE-4

Concerning the communication slave unit 401, i.e., address "O1"

| | |
|---|---|
| Sensor B11S | $1^{st}$ bit (1 or 0) |
| Sensor B12S | $2^{nd}$ bit (1 or 0) |
| Sensor B13S | $3^{rd}$ bit (1 or 0) |
| Sensor B21S | $4^{th}$ bit (1 or 0) |
| Sensor B22S | $5^{th}$ bit (1 or 0) |
| Sensor B23S | $6^{th}$ bit (1 or 0) |
| Sensor B31S | $7^{th}$ bit (1 or 0) |
| Sensor B32S | $8^{th}$ bit (1 or 0) |
| Sensor B33S | $9^{th}$ bit (1 or 0) |

TABLE-5

Concerning the communication slave unit 402, i.e., an address "02"

| | |
|---|---|
| Sensor A1S | $1^{st}$ bit (1 or 0) |
| Sensor A2S | $2^{nd}$ bit (1 or 0) |
| Sensor A3S | $3^{rd}$ bit (1 or 0) |
| Sensor A4S | $4^{th}$ bit (1 or 0) |
| Sensor A5S | $5^{th}$ bit (1 or 0) |
| Sensor A6S | $6^{th}$ bit (1 or 0) |
| Sensor A7S | $7^{th}$ bit (1 or 0) |
| Sensor A8S | $8^{th}$ bit (1 or 0) |
| Sensor A9S | $9^{th}$ bit (1 or 0) |
| Sensor E11S | $10^{th}$ bit (1 or 0) |
| Elevation Sensor E12S | $11^{th}$ bit (1 or 0) |
| Sensor E21S | $12^{th}$ bit (1 or 0) |
| Elevation Sensor E22S | $13^{th}$ bit (1 or 0) |

TABLE-6

Concerning the communication slave unit 403, i.e., address "03"

| | |
|---|---|
| Sensor C11S | $1^{st}$ bit (1 or 0) |
| Sensor C12S | $2^{nd}$ bit (1 or 0) |
| Sensor C13S | $3^{rd}$ bit (1 or 0) |
| Sensor C21S | $4^{th}$ bit (1 or 0) |
| Sensor C22S | $5^{th}$ bit (1 or 0) |
| Sensor C23S | $6^{th}$ bit (1 or 0) |

FIGS. 8A to 8D are diagrams showing memory maps of the data storage 303, wherein FIG. 8A shows a sensor memory 303a for storing detection contents of the sensors S, FIG. 8B shows a motor memory 303b for storing the operation command contents of the motorized rollers 10, FIG. 8C shows a bar code memory 303c for storing read contents of the bar code reader 500 and FIG. 8D shows a stopper memory 303d for storing detection contents of the stopper sensors S. The communication master unit 301 writes the received bit signals in the respective memories 303a to 303d while converting them into code data recognizable by the conveyance controller 300 in accordance with the above TABLES.

More specifically, the detection contents of all the sensors B11S to C23S are written in the sensor memory 303a. Depending on the presence or absence of the packet, "47 (presence)/40(absence)" (hereinafter, referred to as 47(H), 40(H)) are allotted in HEX code. The contents of the operation command given to all the motorized rollers B11M to C23M are written in the motor memory 303b. In response to a start/stop command, "4F(start)/41(stop)" (hereinafter, referred to as 4F(H), 41(H)) is allotted in HEX code.

Data of the conveyance ends are written in the bar code memory 303c. The conveyance end is the unloading conveyor 121 if 31(H) is written in the address "04", whereas it is the unloading conveyor 122 if 32(H) is written there. The contents of the elevation commands given to the elevation motors E12M, E22M are written in the stopper memory 303d. In response to an upward/downward command, 4F(H)/41(H) is allotted.

The operation command data generator 304 reads the detection codes in the respective columns (sensors) of the sensor memory 303a, and writes 4F(H) in a corresponding column (motorized roller) of the motor memory 303b if the read detection code is 47(H) while writing 41(H) in the corresponding column (motorized roller) of the motor memory 303b if it is 40(H). The elevation command data generator 306 writes 4F(H), 41(H) in columns of the stopper memory 303d corresponding to the elevation motors E12M, E22M, respectively, if the content of the address "04" of the bar code memory 303c is 31(H) while writing 41(H), 4F(H) in the columns corresponding to the elevation motors E12M, E22M, respectively, if it is 32(H).

The respective contents of the commands written in the motor memory 303b and the stopper memory 303d are successively cyclically sent out to the serial transmission line L0 by the communication master unit 301 while being attached to the transmitting-side packets "01" to "04" in the order of the addresses. The packets corresponding to the addresses "05" to "07" are invalid packets in this embodiment, a conveyance control can be executed by making many conveyance ends identifiable using the remaining packets (i.e., addresses "05" to "07") in a mode of the conveyor system having diversified conveyance ends.

Figure 9:
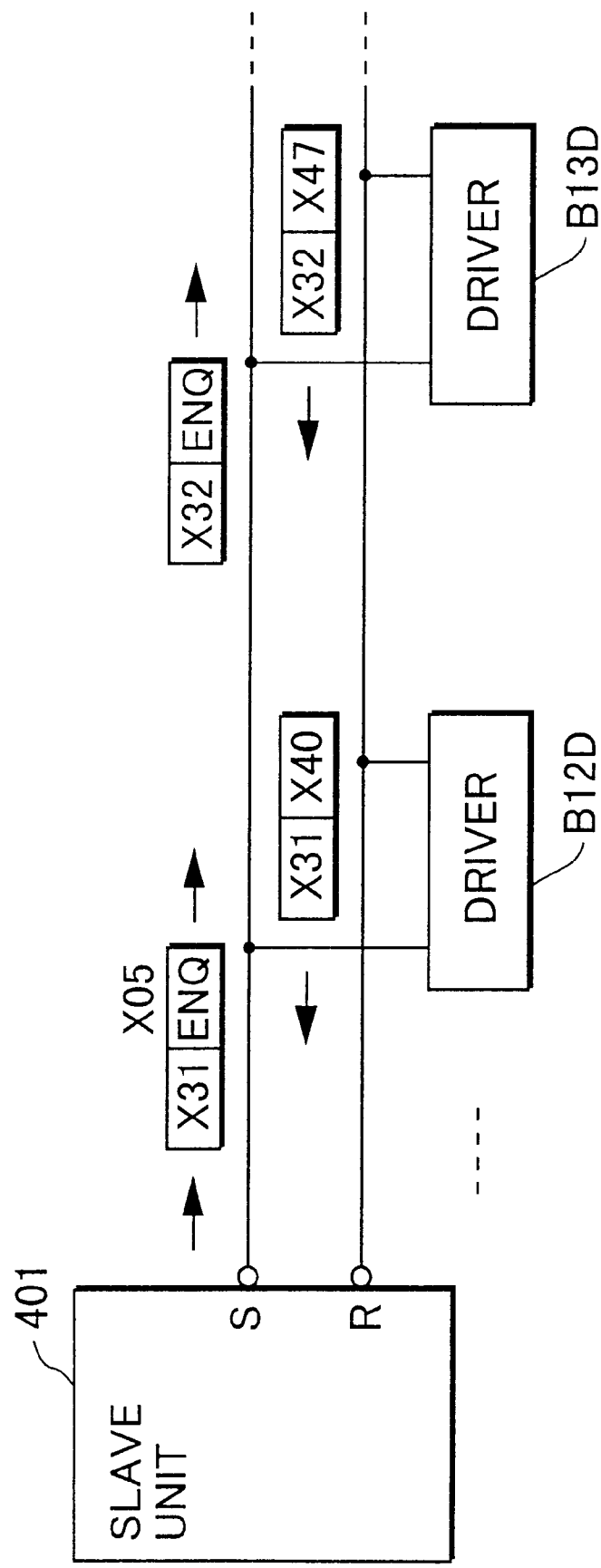
FIG. 9 is a diagram showing data communications between a communication slave unit and drivers.

FIG. 9 is a diagram showing data communications between a communication slave unit and drivers. A data communication between the communication slave unit 401 and the driver is described as an example.

The communication slave unit 401 conducts data communications with a plurality of drivers in its lower rank in addition to the data communication with the communication master unit 301 via the serial transmission line L0 by the packet-switching exchange. A data format is, for example, comprised of 4 bits and has a start data STX at the first bit, an end data ETX at the last bit, an address portion for specifying the driver at the second bit, and a data portion at the third bit. Addresses 30(H) to 39(H) are allotted for the drivers B11D to B33D in the address portion. The content of the data portion from the communication slave unit 401 includes a reply requiring data ENQ and the operation command data (further includes the elevation command data in the communication slave unit 402), and data the communication slave unit 401 receives in accordance with the reply requiring data ENQ include data representing the detection contents of the sensors B11S to B33S (detection data from the sensors E11S, E12S, E21S, E22S in the communication slave unit 402). As described above, 41(H)/4F(H) is allowed as an operation command data, and 47(H)/40(H) is allotted as a sensor detection data.

The communication slave unit 401 repeatedly inquires whether or not the sensors S have detected the palettes by designating the addresses allotted to the respective drivers, and receives the detection data of the sensors S from the drivers B11D to B33D having received the reply requiring data ENQ, i.e., performs a so-called polling.

FIG. 9 shows a state of polling. If the communication slave unit 401 sends a reply requiring data ENQ designating the driver (e.g., the driver B12D) of the address 31(H), a data 40(H) representing the absence of the palette detection data is immediately transmitted from the driver B12D allotted to the address 31(H) to the communication slave unit 401. Further, if the communication slave unit 401 sends a reply requiring data ENQ designating the driver (e.g., the driver B13D) of the address 32(H), a data 47(H) representing the presence of the palette detection data is immediately transmitted from the driver B13D allotted to the address 32(H) to the communication slave unit 401.

A procedure of the conveyance control executed in accordance with the conveyance control program in the conveyance controller 300 constructed as above is described below. The following description is given assuming that a palette to be conveyed to the unloading conveyor 122 is placed on the loading conveyor 112. When the palette is placed on the loading conveyor 112, the sensor B21S detects the presence of the palette and the driver B21D receives this detection signal. The driver B21 transmits the data 47(H) representing the presence of the palette to the communication slave unit 401 via the serial transmission line L1 in response to the reply requiring data ENQ from the communication slave unit 401. It should be noted that the other lower-rank sensors B22S, B23S receive the data 40(H)). When receiving its own receiving-side packet after the receipt of the above data, the communication slave unit 401 sends it out while setting "1", "0", "0" in the $4^{th}$ to $6^{th}$ bits allotted to the drivers B21D to B23D. The communication master unit 300 receives this receiving-side packet. In this packet, corresponding detection results of the sensors are also set in the $1^{st}$ to $3^{rd}$ and $7^{th}$ to $9^{th}$ bits. Since the $4^{th}$ bit is "1", i.e., the sensor B21S detected the palette, the communication master unit 301 writes 47(H) in the column of the sensor B21S of the sensor memory 303a.

The operation command data generator 304 writes 4F(H) in the column of the motorized roller B21M corresponding to the motor memory 303b upon recognizing that 47(H) is written in the column of the sensor B21S. The communication master unit 301 attaches the content of the motor memory 303b to the transmitting-side packet, i.e., sets "1" in the $4^{th}$ bit of the address "01", and sends it out to the serial transmission line L0 at a corresponding transmission timing. The communication slave unit 401 discriminates that the address is "01", confirms the contents as its own transmitting-side packet, and sends 4F(H) to the driver B21D since "1" is set in the $4^{th}$ bit. Consequently, the driver B21D outputs a drive control signal to the motor 12 of the motorized roller B21M to start rotation. The motorized roller B21M starts rotating in this way, and the palette starts moving toward the motorized roller B22M at the downstream side.

When the palette comes to a position above the motorized roller B22M, the sensor B22S detects the presence of the palette. Upon such a detection, the motorized roller B22M starts rotating and stops rotating upon the completion of its duty to convey the palette. Power saving is realized by causing the motorized rollers not contributing to the conveyance of the palettes to stay inoperative as long as possible.

When the sensor B23S detects the presence of the palette further conveyed by the motorized roller B22M, the operation command data generator 304 judges whether the sensor A3S (and the sensor A2S immediately upstream from the sensor A3S if necessary) of the main conveyor 101 has detected the presence of an other palette. If the sensor A3S (and the sensor A2S) has(have) detected the other palette, the other palette strikes against the above palette at a joint position of the conveyance paths. Accordingly, the operation command data generator 304 writes 4F(H) in the column of the motorized roller B23M after waiting while leaving 41(H) in the column of the motorized roller B23M of the motor memory 303a until the sensor A3S (and the sensor A2S) detect(s) the absence of any other palette, i.e., no chance of a crash of palettes. As a result, the driving of the motorized roller B23M is started. If the sensor A3S (and the sensor A2S) has(have) already detected the absence of any other palette, the operation command data generator 304 immediately writes 4F(H) in the column of the motorized roller B23M because of no chance of a crash, the motorized roller B23M continues to be driven.

When the palette being conveyed reaches the joint position and the sensor B23S detects the absence of the palette, the motorized roller A3M starts rotating to convey the joined palette toward the motorized roller A4M. Subsequently, this palette is conveyed up to the motorized roller A6M in a similar manner, and the conveyance end discriminator 305 starts causing the bar code reader 500 to perform a reading operation when the sensor A6S detects the presence of the palette. While the palette passes the position where the bar code reader 500 is provided, the bar code reader 500 reads a bar code representing a conveyance end and written on one side surface of the palette. The first two characters of the character data obtained from the read data are attached to a packet corresponding to the address "04", and this packet is transmitted from the communication slave unit 402 to the communication master unit 301 via the serial transmission line L0. Upon receiving this data, the communication master unit 301 writes a data 32(H) representing the conveyance end, i.e., the unloading conveyor 122, in the column of the address "04" of the bar code memory 303c.

Subsequently, when the palette passes the sensor A7S and is detected by the sensor E11S, the conveyance end discriminator 305 confirms the content in the column of the address "04", and outputs this content to the elevation command data generator 306. The elevation command data generator 306 writes 41(H) in the column of the sensor E21S of the stopper memory 303d upon judging that the conveyance end switching mechanism 210 needs not be driven. This data is sent to the driver A0D from the communication master unit 301 via the communication slave unit 402 to control the driver A0D not to drive the elevation motor. Accordingly, the stopper 212 is held in its lowered position. Thus, the palette passes the position of the conveyance end switching mechanism 212 without changing its conveyance path, i.e., is conveyed substantially straight (although the palette is subjected to a moving force of the unloading conveyor 121), it immediately comes into sliding contact with the side wall 1a at the downstream side of the main conveyor 101 and consequently moves straight). As a result, the palette is detected by the next sensor A8S. When the sensor A8S detects the presence of the palette, the motorized roller A8M starts rotating. When the palette is detected by the sensor E21S, the elevation command data generator 306 judges that the conveyance end switching mechanism 220 needs to be driven and drives the elevation motor to move the stopper 222 up to the elevated position, thereby hindering the passage of the palette. By controlling the motorized roller A8M to continue its rotation to thereby rotate the roller units 221, i.e., rollers 224 in this state, a laterally (upward in FIG. 4) acting moving force is given to the palette having reached the conveyance end switching mechanism 220. The palette cannot move forward any further by coming into contact with the stopper 222 and moves toward the unloading conveyor 122 by turning at right angles upon being subjected to the moving force acting in the direction of 45°. Therefore, the palette moves onto the unloading conveyor 120 after passing the conveyance end switching mechanism 220.

As the palette moves on, the sensors C21S, C22S, C23S successively detect the presence thereof and the corresponding motorized rollers C21M, C22M, C23M are driven. In this way, the palette is conveyed to the unloading station at the most downstream position of the unloading conveyor 122. At the unloading station, contained items on the palette are collected and put into a box or bag to be brought to a destination or accommodated in a means of transportation.

If t he conveyance end of the palette is neither the unloading conveyor 121 nor 122, the palette is conveyed until the presence thereof is detected by the sensor A9S at the most downstream position of the main conveyor 101.

Although the motorized rollers and the sensors are provided in one-to-one correspondence in the foregoing embodiment, the present invention is not limited to such a mode. For example, one sensor may be provided in an upstream position for a specified number of motorized rollers. In such a case, the position of the palette can be administered after the sensor is turned on if a conveying speed by the motorized rollers is known. A control may be executed in a position administering system based on time to successively drive the motorized rollers from an upstream one to a downstream one. Alternatively, an encoder may be provided in each motorized roller using two elements which move relative to each other, and the position may be administered by calculating a conveyance amount based on a pulse of the encoder representing the rotation. If these systems are adopted, the number of the sensors can be reduced, with result that more wirings can be saved.

Although one communication slave unit is provided, e.g., for the main conveyor in the foregoing embodiment, if the conveyor assembly is long, it may be divided into sections having a suitable length and a plurality of communication slave units may provided for the respective sections.

Further, in the foregoing embodiment, the operation command data generator 304 of the conveyance controller 300 generates the data of commands to rotate the motorized rollers and stop the rotation thereof. However, if the conveyor assembly is, for example, extensively long or has a complicated joint and branch construction, a huge number of motorized rollers are provided. In such a mode, a load of generating the command data on the operation command data generator 304 is increased and, consequently, there is a possibility that the command data for all the motorized rollers cannot be generated in time. In consideration of such a case, the operation command data generator 304 may generate only the drive command data for the motorized rollers, and command data used to stop the rotation of the motorized rollers may be generated in the corresponding communication slave units. In such a case, each communication slave unit is provided with a data memory necessary for operation command data generator 304 to generate the operation command data, a means having a program for generating the rotation stop command data and a means for sending the rotation stop command data to the drivers corresponding to all the motorized rollers (motorized rollers on which no palette is placed, including those which were rotated, but are assumed to have completed their duties by the passage of the palettes) excluding those instructed to be rotated.

Further, the type of the motors is not limited according to the present invention. Besides direct current motors, alternating current motors may also be used.

As described above, an inventive conveyance system comprises a conveyor assembly provided with a first conveyor unit and a second conveyor unit arranged after the first conveyor unit. Each conveyor unit is constructed such that a multitude of motorized rollers whose rotary drums are relatively driven to rotate by built-in motors. There are provided a plurality of free rollers between two adjacent motorized rollers. The motorized rollers are driven to convey items from the first conveyor unit to the second conveyor unit. Further, there is provided a conveyance controller having a communication master function, sensors provided in specified positions of the first and second conveyor units corresponding to the respective motorized rollers for detecting the presence or absence of the items, first and second communication slave units provided in positions corresponding to the first and second conveyor units and be able to communicate with the first and second conveyance controllers in serial transmission, and transmitting/receiving devices provided so as to enable data communications between the first and second communication slave unit and the respective motorized rollers and their corresponding sensors and adapted to transmit drive signals for the respective motorized rollers to the corresponding communication slave units and receive detection signals of the sensors. The conveyance controller includes a receiver for cyclically receiving the detection signals of the respective sensors via the first and second communication slave units, a command data generator for generating operation command data to rotate or stop the relating motorized rollers in response to the detection signals from the respective sensors received by the receiver, and a transmitter for cyclically transmitting the generated operation command data to the first and second communication slave units in serial transmission.

In the conveyance system thus constructed, the first and second conveyor units are connected with each other so that the items to be conveyed are transferrable, i.e., merely continuously arranged or joined together or branched off from each other. The communication slave units are so provided in specified positions of a side wall of the conveyor assembly as to correspond to the first and second conveyor units, and are connected with the communication master function section of the conveyance controller having a communication master function by a serial transmission line such that data communications can be conducted using, for example, the packet-switching exchange system. Further, the sensors for detecting the presence or absence of items to be conveyed are so provided as to correspond to a plurality of motorized rollers arranged in the respective conveyor units. The transmitting/receiving device or drivers corresponding to the respective motorized rollers and their corresponding sensors are provided in the specified positions of the conveyor assembly. The motorized rollers and their corresponding sensors are connected with the transmitting/receiving devices by wiring. Thus, it is possible to feed operation command data to the motorized rollers from the transmitting/receiving devices and, conversely, to receive the detection signals of the sensors. A plurality of motorized rollers and their corresponding sensors which construct the respective conveyor units conduct data transmissions with the upper-rank communication slave units, and the respective communication slave units transmit the data to the communication master functioning section by the packet-switching exchange.

The communication master functioning section allots addresses to the first and second communication slave units, and sends out packets to the serial transmission line while attaching command data for the individual lower-rank transmitting/receiving devices of the respective communication slave units thereto. The respective communication slave units receive their own packets to receive the sent data. As a result, the respective communication slave units can send suitable command data to the individual lower-rank transmitting/receiving devices.

The command data generator analyzes the detection signals of the sensors received via the respective transmitting/receiving devices and communication slave units, and gives operation commands to drive the motorized rollers in positions where the presence of an item was detected while giving operation commands to stop the motorized rollers having conveyed items. In this way, a power saving can be realized. Since the communication master functioning section and the communication slave units in charge of the respective conveyor units are connected by the serial transmission line and the data are transferred by, for example, the packet-switching exchange, it is sufficient to, for example, provide two wirings in the case of half-duplex operation and four (or three) wirings in the case of full-duplex operation. Thus, wirings can be saved. Particularly in the case of a huge conveyor assembly in which the conveyor units are joined and branched in many positions, the effect of saving the wirings is remarkable. If the respective communication slave units and the lower-rank transmitting/receiving devices are also communicated in serial transmission, the wirings can be further saved.

Preferably, the first conveyor unit may be so arranged as to continuously join the second conveyor unit, and the conveyance controller controllably drives the motorized rollers of the first conveyor unit in accordance with the detection signals of the sensors of the second conveyor unit. Further preferably, the second conveyor unit is so arranged as to continuously branch off from the first conveyor unit, a reader for reading a conveyance end of the item from the item is provided in a position upstream from a branched-off position of the second conveyor unit from the first conveyor unit, and the conveyor controller controls the conveyance end of the item based on the result of the reader. With these constructions, the items can be suitably conveyed to desired downstream ends even if the conveyor units are joined and branched off in the conveyor assembly.

Preferably, a conveyance end switching mechanism may be provided at the branched-off position, and the conveyance controller controllably drives the conveyance switching mechanism based on the read result of the reader. With this construction, the items can be more actively conveyed to the desired conveyor unit by the conveyance end switching mechanism.

Further preferably, the speed of data communications between the respective communication slave units and their corresponding transmitting/receiving devices may be higher than the speed of one-scan data communications including data communications between the conveyance controller and the first and second communication slave units. With this construction, since the communication slave units can constantly attach the detection signals of the sensors to, for example, the packets cyclically sent thereto, a high-precision conveyance control can be more suitably performed.

This application is based on patent application No. 11-288559 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A conveyance system comprising:

a conveyor assembly including a first conveyor unit and a second conveyor unit arranged after the first conveyor unit, each conveyor unit being provided with a plurality of motorized rollers each having a rotary drum and a motor for rotating the rotary drum, and a plurality of free rollers arranged between two adjacent motorized rollers, the motorized rollers being driven to convey items from the first conveyor unit to the second conveyor unit;

a conveyance controller having a communication master function;

a sensor provided at a position corresponding to each of the plurality of motorized rollers in each of the first and second conveyor units for detecting presence or absence of an item;

a first communication slave unit provided in a position corresponding to the first conveyor unit and be able to communicate with the conveyance controller in serial transmission;

a second communication slave unit provided in a position corresponding to the second conveyor unit and be able to communicate with conveyance controller in serial transmission; and a transmitting/receiving device for rendering communications between each sensor and the corresponding communication slave unit and communications between each motorized roller and the corresponding communication slave unit to transmit a drive signal for the corresponding motorized roller to the corresponding communication slave unit and receive a detection signal of the corresponding sensor;

wherein the conveyance controller includes:

a receiver for cyclically receiving respective detection signals of the sensors via the first and second communication slave units;

a command data generator for generating operation command data to rotate or stop relating motorized rollers in response to the detection signals from the sensors received by the receiver; and a transmitter for cyclically transmitting generated operation command data to the first and second communication slave units in serial transmission.

2. A conveyance system according to claim 1, wherein the speed of data communications between each communication slave unit and the corresponding transmitting/receiving devices is higher than the speed of one-scan data communications including the data communication between the conveyance controller and the each communication slave unit.

3. A conveyance system according to claim 1, wherein the first conveyor unit is so arranged as to continuously join the second conveyor unit, and the conveyance controller controllably drives motorized rollers of the first conveyor unit in accordance with detection signals of the sensors of the second conveyor unit.

4. A conveyance system according to claim 3, wherein the speed of data communications between each communication slave unit and the corresponding transmitting/receiving devices is higher than the speed of one-scan data communications including the data communication between the conveyance controller and the each communication slave unit.

5. A conveyance system according to claim 1, wherein the second conveyor unit is so arranged as to continuously branch off from the first conveyor unit, further comprising a reader for reading a conveyance end of the item from the item in a position upstream from a branched-off position of the second conveyor unit from the first conveyor unit, wherein the conveyor controller controls the conveyance end of the item based on the result of the reader.

6. A conveyance system according to claim 5, wherein the speed of data communications between each communication slave unit and the corresponding transmitting/receiving devices is higher than the speed of one-scan data communications including the data communication between the conveyance controller and the each communication slave unit.

7. A conveyance system according to claim 5, further comprising a conveyance end switching mechanism at the branched-off position, wherein the conveyance controller controllably drives the conveyance switching mechanism based on the read result of the reader.

8. A conveyance system according to claim 7, wherein the speed of data communications between each communication slave unit and the corresponding transmitting/receiving devices is higher than the speed of one-scan data communications including the data communication between the conveyance controller and the each communication slave unit.

* * * * *